(12) United States Patent
Roy

(10) Patent No.: US 10,271,686 B2
(45) Date of Patent: Apr. 30, 2019

(54) KITCHEN IN A BOX COOKING APPLIANCE WITH SELECTABLY ENGAGED INDEPENDENT STIRRING AND HEATING CONTROL FOR A PLURALITY OF COOKING STATIONS

(71) Applicant: Shambhu Roy, Roseville, CA (US)

(72) Inventor: Shambhu Roy, Roseville, CA (US)

( * ) Notice: Subject to any disclaimer, the term of this patent is extended or adjusted under 35 U.S.C. 154(b) by 200 days.

(21) Appl. No.: 15/585,131

(22) Filed: May 2, 2017

(65) Prior Publication Data
US 2018/0317705 A1 Nov. 8, 2018

(51) Int. Cl.
| | |
|---|---|
| A47J 36/16 | (2006.01) |
| A47J 37/06 | (2006.01) |
| F24C 7/08 | (2006.01) |
| A47J 44/00 | (2006.01) |
| A47J 37/12 | (2006.01) |
| A47J 37/10 | (2006.01) |
| F24C 15/14 | (2006.01) |
| F24C 15/20 | (2006.01) |
| F24C 15/18 | (2006.01) |

(52) U.S. Cl.
CPC ......... *A47J 37/0629* (2013.01); *A47J 36/165* (2013.01); *A47J 44/00* (2013.01); *F24C 7/086* (2013.01); *A47J 37/105* (2013.01); *A47J 37/129* (2013.01); *A47J 37/1209* (2013.01); *A47J 37/1266* (2013.01); *F24C 15/14* (2013.01); *F24C 15/18* (2013.01); *F24C 15/2035* (2013.01)

(58) Field of Classification Search
CPC ....... A47J 36/165; A47J 44/00; A47J 37/0629
See application file for complete search history.

(56) References Cited

U.S. PATENT DOCUMENTS

| | | | | |
|---|---|---|---|---|
| 3,905,585 A * | 9/1975 | Wallman | ............ | A47J 36/165 |
| | | | | 366/282 |
| 5,535,665 A * | 7/1996 | Wong | ............ | A47J 27/14 |
| | | | | 366/244 |
| 9,585,516 B2 * | 3/2017 | Harding | ............ | A47J 36/06 |
| 9,693,654 B2 * | 7/2017 | Smith | ............ | A47J 36/34 |
| 2014/0245904 A1 * | 9/2014 | Conti | ............ | A47J 27/002 |
| | | | | 99/348 |

* cited by examiner

*Primary Examiner* — Kevin F Murphy

(57) ABSTRACT

A kitchen in a box automatic cooking appliance with various cooking stations and a deep frying station along with selectable lid integrated stirring mechanism with remote stirring power source. Floor and wall mounted ingredient bins and containers along with universal tool carrier to bring in fluidic ingredients to be delivered to cooking stations. Removable components for easy cleaning of the automatic cooking appliance and the components. Heating control by using temperature sensor in contact with cooking vessels by attaching actuator mechanisms on knobs of off the shelf induction and gas stoves.

19 Claims, 14 Drawing Sheets

KITCHEN IN A BOX COOKING APPLIANCE WITH SELECTABLY ENGAGED INDEPENDENT STIRRING AND HEATING CONTROL FOR A PLURALITY OF COOKING STATIONS

BACKGROUND OF THE INVENTION

The present invention generally relates to automatic cooking machines for use in preparing dishes using recipe steps and cooking conditions coded as a computer program in association with human or material handling robots facilitating transfer of ingredients to cooking stations.

A need exists for a cooking appliance for use in automated home cooking as disclosed in U.S. Pat. No. 9,131,807. U.S. Pat. No. 782,224 by Oleynik, U.S. Pat. No. 7,174,830 by Dong and U.S. Pat. No. 8,276,505 by Buehler all disclose food preparation environments that are similar to traditional kitchens with large flat workspaces more than several yards in length shared by ingredients, cooking tools and cooking stations. Such large conventional kitchen automation systems when fully built occupy a large space and use large size industrial robots when fully automated for cooking ingredients transfer resulting with similar overall system sizes as a conventional kitchen and not suitable for use as a self-contained appliance of reasonable size or fit in small spaces such as a small kitchen in a high-rise apartment, condominium, recreational vehicle, a watercraft or an aircraft. They are also very expensive to build due to their large sizes even without the material handling robots and will require significant retrofitting and construction costs to incorporate into existing homes if needed.

Further all food preparations systems disclosed in prior art, have been invented to replace a human cook in a home environment preparing one or two dishes simultaneously or as larger batch processing systems for a business for efficiency with high food production rates or a small device with a single cooking station such as an automated crock-pot and none can fill the need of a fully functional automatic home cooking machine appliance with plurality of stations working independently comparable in form to a household cooking range, refrigerator or dishwasher.

A need exists for a highly compact, self-contained, reliable fully functional automated home cooking appliance that is useful for cooking to homeowners, apartment dwellers, recreational vehicle owners, on yachts and aircrafts.

A need therefore exists to provide an automatic cooking appliance that allows cooking of several varied dishes simultaneously and able to monitor laborious cooking processes such as stirring and heating control freeing up a human cook or robot from such time consuming tasks and eliminate task overload for a human or robot when multiple dishes or stations need simultaneous monitoring or physical assistance. Further, the footprint and cost of such automatic cooking appliance needs to be affordable and contained within a well-defined envelope same as other home appliances.

BRIEF SUMMARY OF THE INVENTION

The present invention provides a fully functional kitchen in a box automatic cooking appliance with multiple cooking stations and ingredient storage in an envelope that is comparable to current kitchen appliance sizes such as a standard cooking range oven 36" wide or a household refrigerator. Such a cooking appliance is used in association with a material handling gantry or SCARA robot for spatial motion with additional degrees of freedom end effectors for ingredients transfer into cooking stations achieving a fully automated cooking system or a semi-automatic system with a human to assist in material handling.

An object of the invention is to add fully independent automation for each cooking station for laborious tasks of stirring and heating control the two most essential aspects of cooking such that a human or robot could be freed of those activities. This will allow plural dishes to be prepared simultaneously, as it is not possible for most human cooks to stir two or more dishes simultaneously and maintain the proper temperature at the same time. Critical parameters affecting cooking, temperature and time can now be incorporated in recipes executed by an electronic controller or computer. Another object of the invention is to make the stirrer able to selectively engage or disengage from the stirrer power delivery source. Further object is to remotely locate the power delivery source for stirring and preferably inside main controller. Further the stirrer, lid and power transmission mechanisms are removable for easy cleaning manually or by placing them inside a household dishwasher.

Yet another object of the invention is to incorporate various types of cooking vessels including but not limited to a large and small sauce pans, casseroles, stir frying or skillet pans, deep fryers enabling a large number of recipes in a single cooking appliance using computer recipes. Also an object of the invention is to add temperature sensors that touch the cooking pots when they are placed at the cooking stations. A further object is to have embedded temperature sensors in the cooking pots which get plugged and connected as the pots are placed at the cooking stations.

An object of the invention is to store the ingredients along the floor and walls of the automatic cooking appliance frame making it possible to reduce the overall footprint without compromising the number of ingredients and their quantities. It is also an object of the invention that the cooking appliance be able to fit on standard 26"/30" deep kitchen counters. Another object of the invention is to equip the kitchen in a box automatic cooking appliance with exhaust fan, filter, over temperature interlocks making is safe for use in average home environments.

A further object of the invention is to provide independent dedicated actuators connected to the main controller for controlling the amount of heat delivered to each cooking vessel. Further object is to provide actuating mechanisms attached to knobs of existing off the shelf stoves and work with both gas and electric stoves with simple and safe modifications such as removal of manual turn knob covers those are provided for manual control and install electrically actuated knob controls in their place. In case of an electric stove it is also possible to wire the resistive or inductive coil circuits directly to cooking appliance controller without the need for an intermediate knob actuator, however using an electro-mechanical actuator on a standard stove provides a point of isolation between the high voltage heating circuit and the cooking appliance controller electrical circuits.

According to an embodiment of the invention, a universal tool carrier with an extendable cable hose assembly is used for carrying liquid delivery valves, thermocouples, spatulas, cameras all of which need to be transported to a cooking pot or station but also need to stay connected to facilities they need. A liquid delivery line for water, oil and other fluid ingredients must have a valve at the end of the supply line to minimize volume beyond the cut-off point to minimize spills so must have an extendable delivery tube for liquid from the source connection point. A thermocouple used to dip into a dish being cooked for in-situ temperature measurements will need to have the two measurement lead lines extend from the connection point, a wired camera to view the state of the dish through the controller will need power and communication lines going back to respective connection points. The universal tool carrier is facilitated between a fixed connection point using a flexible line that is able to expand and retract to allow a human or robot to carry the universal attachment tool from its storage location to the point of use at any of the cooking pots or stations, ingredient storage bins or another point in the cooking appliance as needed.

According to another embodiment of the invention the stirrer is combined with the lid which allows to stir a dish in a cooking pot while the pot is also covered by the lid. This prevents any spatter while mechanically stirring. Further it reduces the steps needed to start or stop stirring when a pot is covered by eliminating additional steps of opening lid, inserting stirrer, stirring, removing stirrer and closing back with lid; instead the stirring can start and stop anytime and can be continuous as well, without continuously occupying a human cook or a robot. Yet another object is that when a lid is not used, the stirrer can plug into a stirring power source when the stirrer is lowered into a cooking pot.

A further object of the invention is to have the stirrer have cooking pot wall and bottom scraping parts along with stirring or mixing parts to wipe the walls and mix the volume of the cooking pot while the stirrer spins along an axis of the cooking pot. Furthermore the stirrer and lid are attached to the frame using hinges or slides to allow them to swivel out or move up to provide access to the inside of cooking pots form ingredients transfers. In some embodiments the hinge axis is on the inside of the envelope of the cooking pot allowing any condensates or contents deposited on the lid and stirrer to stay on lid or run off back into the cooking pot.

A further object of the invention is to provide independent and dedicated stirring for a cooking station. When an automatic cooking machine is used with a robot for fully automated cooking, a single robot cannot stir and monitor more than a single dish at a time and if splitting its time among multiple such tasks or cooking stations it may cause task overload issues as known in art of automation and real time controls. Some automatic cooking systems have proposed having dual independent robots but every industrial robot causes a significant increase in costs and controls challenges. A human can coordinate two arms or can work with another human in a collaborative manner however as it is well known in the art of robotics it is very challenging to have two independent robots work together in the same workspace as the most basic task of having them run into each other is by itself an algorithmic and computationally intensive task. Hence, it is highly advantageous to have dedicated stirring mechanisms and controls.

A further object is to be able to remove ingredient bins, cooking pots, lids and stirring mechanisms to expose the cooking appliance frame for easy cleaning. Further, the ingredient bins, cooking pots, lids and stirring mechanism can be cleaned manually or placing them in a household dishwasher.

Additional features and advantages of the present invention are described in, and will be apparent from, the detailed description of the preferred embodiments and from the drawings.

BRIEF DESCRIPTION OF THE SEVERAL VIEWS OF THE DRAWING

The following is a description, by way of example only, of different embodiments of the mechanism, its variations, derivations and reductions.

DETAILED DESCRIPTION OF THE INVENTION

Figure 1:
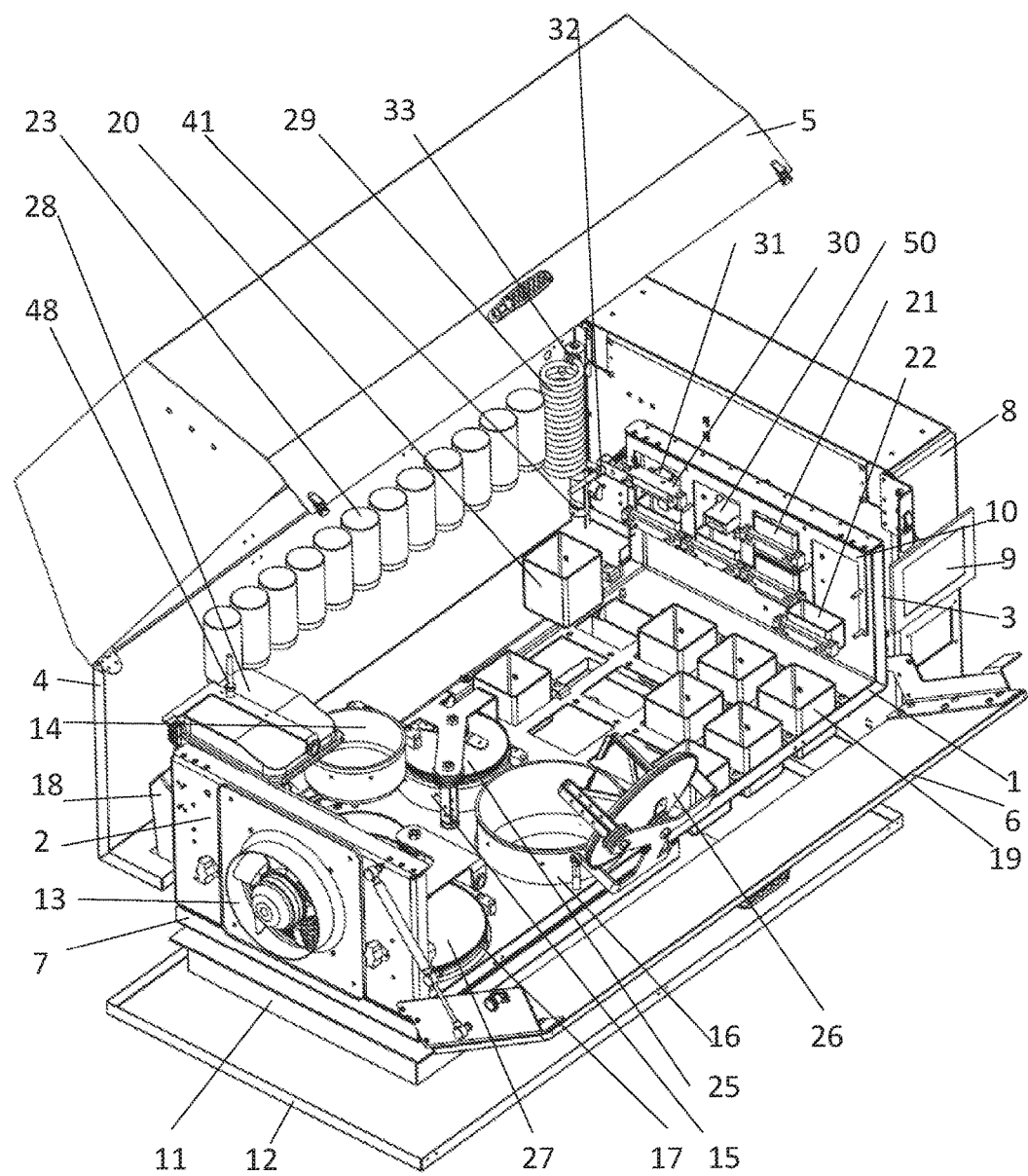
FIG. 1 shows an automatic cooking appliance.
Figure 2:
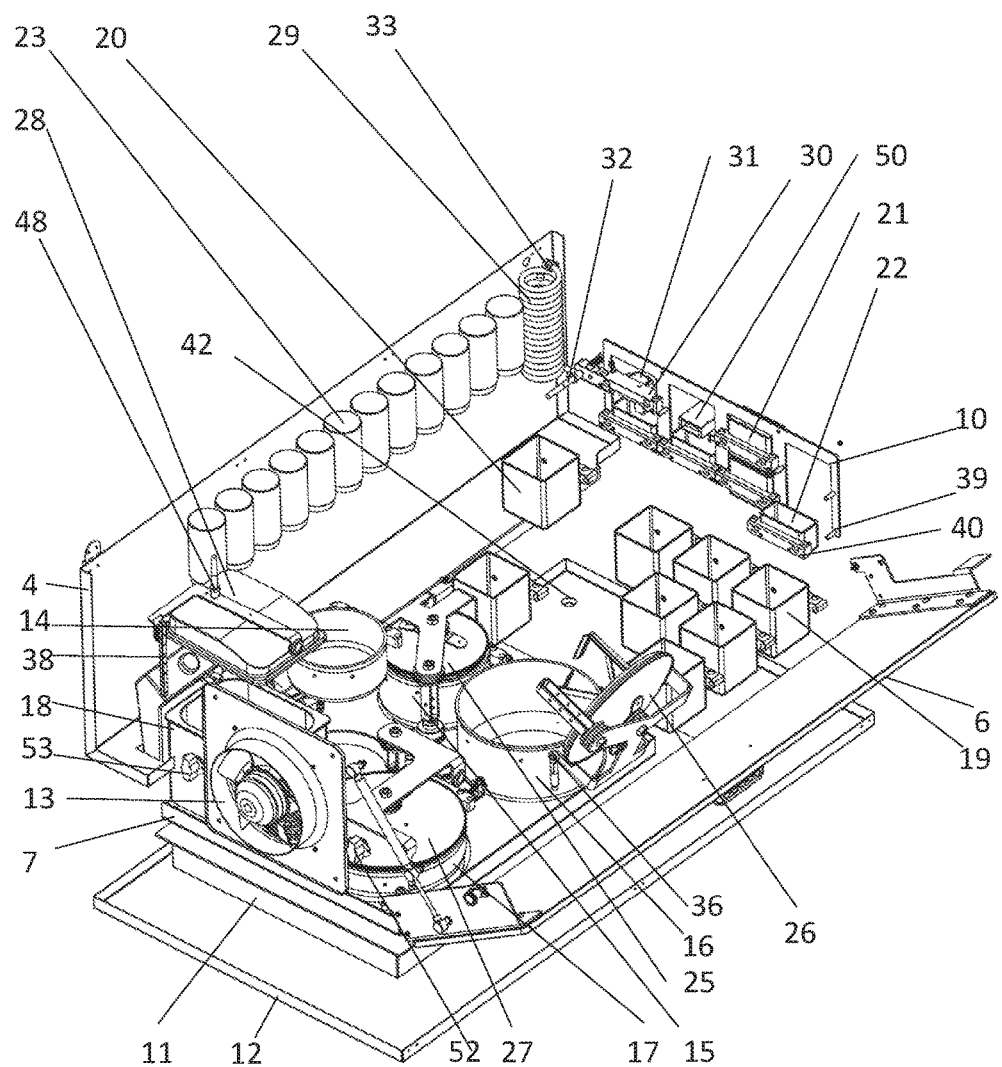
FIG. 2 shows a view of the automatic cooking appliance shown in FIG. 1, with main frame hidden to enable a detailed open view of other components of the automatic cooking appliance.
Figure 3:
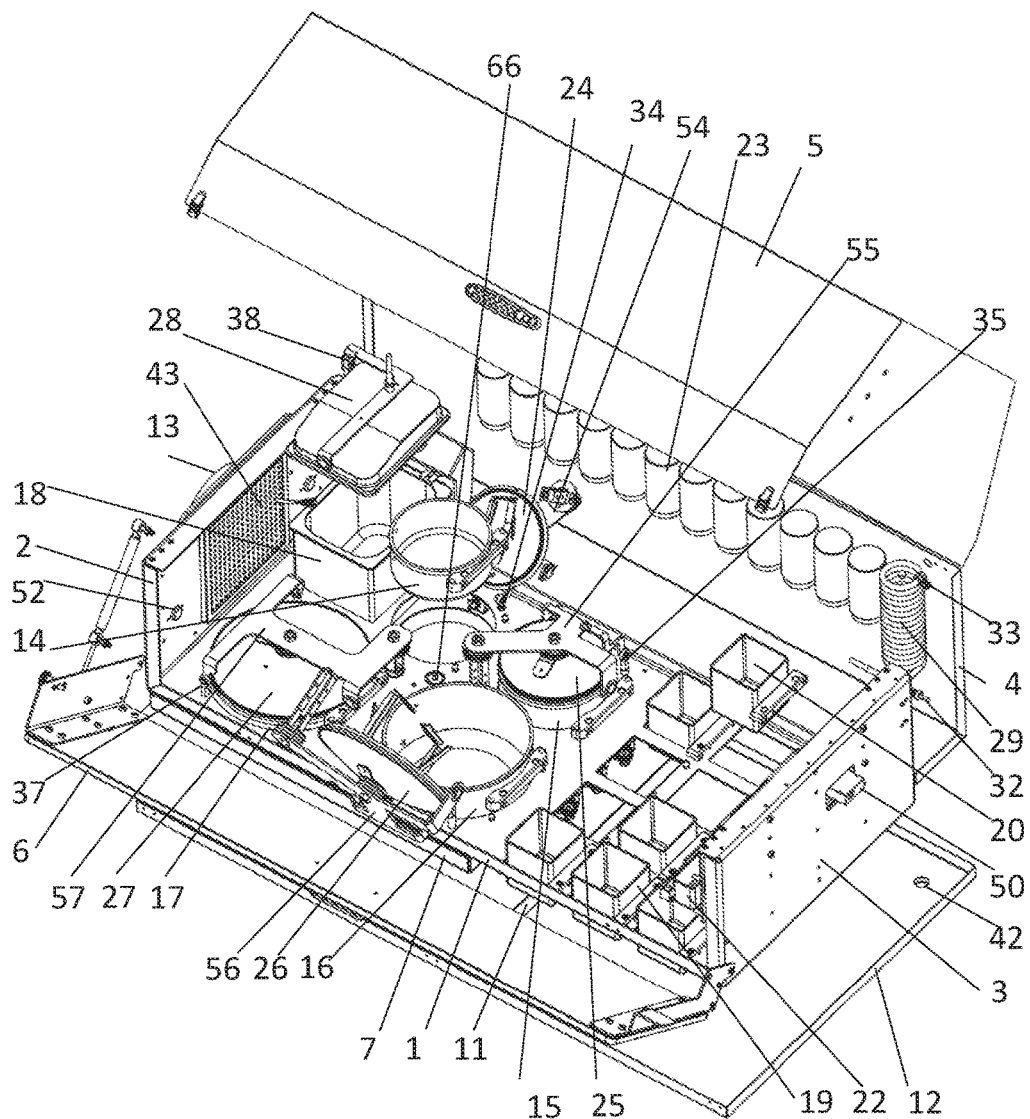
FIG. 3 shows an alternate view of automatic cooking appliance shown in FIG. 1.
Figure 4:
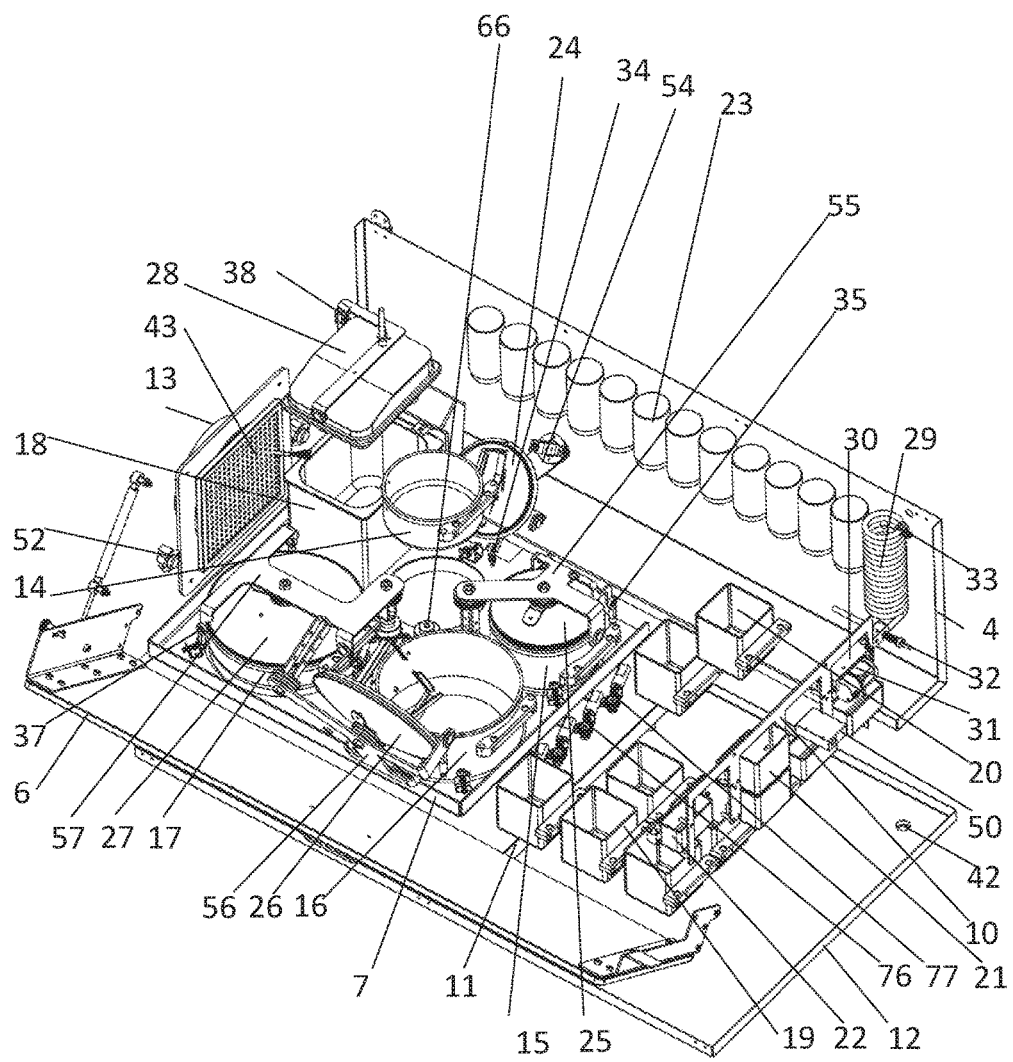
FIG. 4 shows an alternate view of the automatic cooking appliance shown in FIG. 1, with main frame member hidden to enable a detailed open view of other components of the automatic cooking appliance.

Now referring to the drawings, wherein like numerals designate like components, FIGS. 1 and 2 show an automatic cooking appliance with a main frame floor 1, left wall 2 and a right wall 3. FIGS. 3 and 4 show the automatic cooking appliance with the main frame floor 1, left wall 2 and right wall 3 hidden from view only to describe the embodiments of the invention. Main frame floor 1, left wall 2 and right wall 3 are manufactured using stainless steel and are preferably formed from sheet metal. They can also be machined in parts and joined together by fastening or welding. There is a back wall 4 also preferably made from sheet metal and attached securely to the main frame. A roof assembly 5 is attached using hinges to the back wall 4 and able to come down and close off the boxed area along with door assembly 6 also attached to main frame 1 using hinges. There is a mezzanine 7 sandwiched between main frame floor 1 and a stove heater 11. There is a drain tray 12 extending under the automatic cooking appliance. Drain tray 12, left wall 2, right wall 3, back wall 4, roof assembly 5 and door assembly 6 encompass a self-contained fully functional kitchen in a box and all the elements needed for carrying out the process of meal preparations.

A controller 8 has electronic controls, power supplies, sensor interfaces, programmable logic controllers, circuit breakers, wired and wireless communication devices and a touch panel computer 9 with a Graphic User Interface for interaction with a user in order to operate the automatic cooking appliance. The computer also is used to input, store and execute recipes to cook dishes using the automatic cooking appliance.

Figure 5:
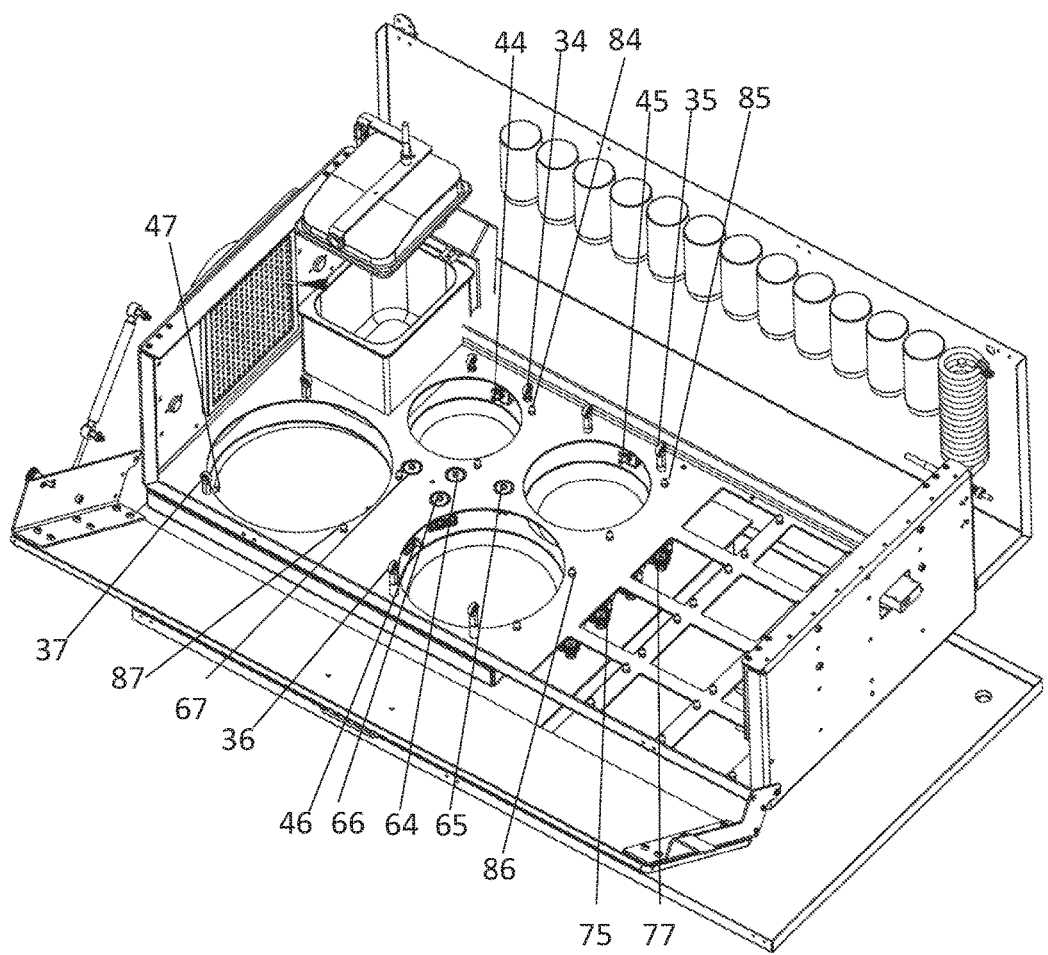
FIG. 5 shows an automatic cooking machine with the cooking pots, lids, stirring mechanisms and ingredient storage bins removed for cleaning.
Figure 6:
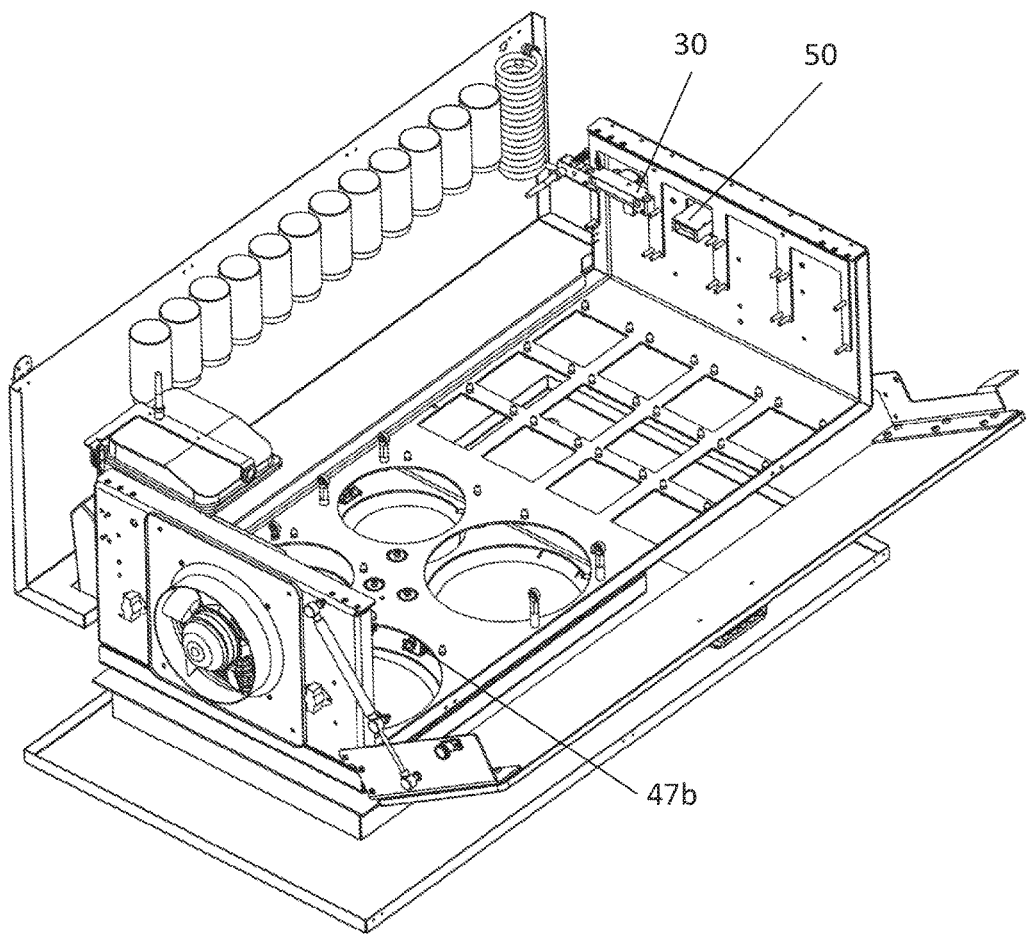
FIG. 6 shows an alternate view of a cooking machine with the cooking pots, lids, stirring mechanisms and ingredient storage bins removed for cleaning.

As can be seen in FIGS. 1-4 and even clearly further in FIGS. 5-6 the main frame floor 1 has placeholder cutouts for cooking stations placing cooking pots 14, 15, 16, 17 and a deep fryer 18. In an embodiment the cooking pot 14 is a 1.5 quart sauce pan, cooking pot 15 is a 2.5 quart sauce pan, cooking pot 16 is a 5 quart casserole, cooking pot 17 is a 3 quart saute pan or skillet and deep fryer 18 has a 2 quart capacity. There are floor placeholder cut outs for storing cooking floor ingredients bins, floor ingredient bin 19 is shown in a stowed position while floor ingredient bin 20 is shown in mid transport position. The floor ingredient bins in an embodiment are about a quart in capacity being 4 inches tall and can be scaled to higher capacity proportionally by increasing height while still able to use same floor placeholder cutouts. As seen in FIG. 1-4, in this embodiment there are 3 rows and 4 columns of floor placeholder cutouts allowing 12 one quart floor ingredient bins. As can be seen in FIG. 5-6 there are respective cooking pot guide pins 84, 85, 86 and 87 to allow accurate placement of floor ingredient bins with corresponding alignment features on the cooking pots.

Further, as seen in FIG. 1-4 the right wall also carries wall ingredient placeholders using cutouts on a wall ingredient mount plate 10 and guide pins 39 fixed to it. A wall ingredient bin 22 is shown being slid and stowed onto side wall pin 39 using a guide hole alignment feature 40 on wall ingredient bin 22. A wall ingredient bin 21 is shown resting onto the corresponding pins onto the ingredient mount plate 10. It is not necessary to use an ingredient mount plate 10 and the side wall pin 39 can be directly fixed onto right wall 3. But having a removal wall ingredient mount plate 10 allows for easy cleaning of right wall 3. Ingredient containers 20 are placed on to back wall 4 and can be picked up and dispensed to the cooking stations using suitable end effector on any robot used in association with the automatic cooking appliance.

Referring to FIG. 1-4, one of the wall ingredient bin placeholders is being used to mount a camera 50 for machine vision and barcode scanning functions and can be easily connected to the controller 8 next to it. A light 41 is attached to controller 8 for illuminating the inside volume of automatic cooking appliance for use with the camera 50. An exhaust fan 13 is mounted to left wall 2 and pulls cooking fumes out of the kitchen in a box automatic cooking machine through a suitable filter 43. Over temperature switches 52 and 53 are incorporate on left wall 2 to detect and prevent unsafe conditions.

Figure 7:
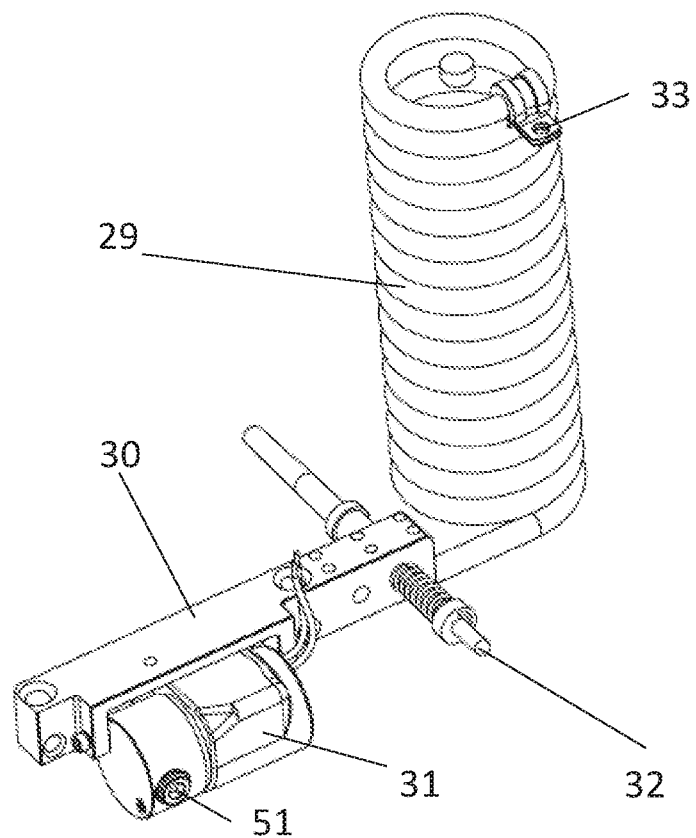
FIG. 7 shows a universal tool carrier detailed view.

Further as seen in FIG. 1-4, a wall ingredient bin placeholder is used to store a universal tool carrier 30. Further as seen in detail view of FIG. 7 the universal tool carrier 30 is carrying an electrically controlled fluid control valve 31 with a fluid exit nozzle 51 and a temperature measurement spring pushed thermocouple sensor 32 in this embodiment. The extendable and retractable tube and electrical cable assembly 29 carries the fluid delivery line, the electrical actuation signal lines of valve and thermocouple signal leads until the fixed clamp connection 33. When used with a suitable robot gripper the universal tool carrier can be picked up from its storage location and moved to any cooking pot or ingredient bins to deliver fluids as needed. Further a robot with suitable end effector can also transport the thermocouple sensor 32 to any cooking pot or other areas and dip in dishes being cooked or push against surfaces to record their temperatures. Even though only one universal tool carrier has been shown in this embodiment, plural universal tool carriers can be used in another embodiment and can utilize other wall ingredient placeholders for storage. In another embodiment other tools including a camera and a mixing tool are attached to a universal tool carrier.

Figure 8:
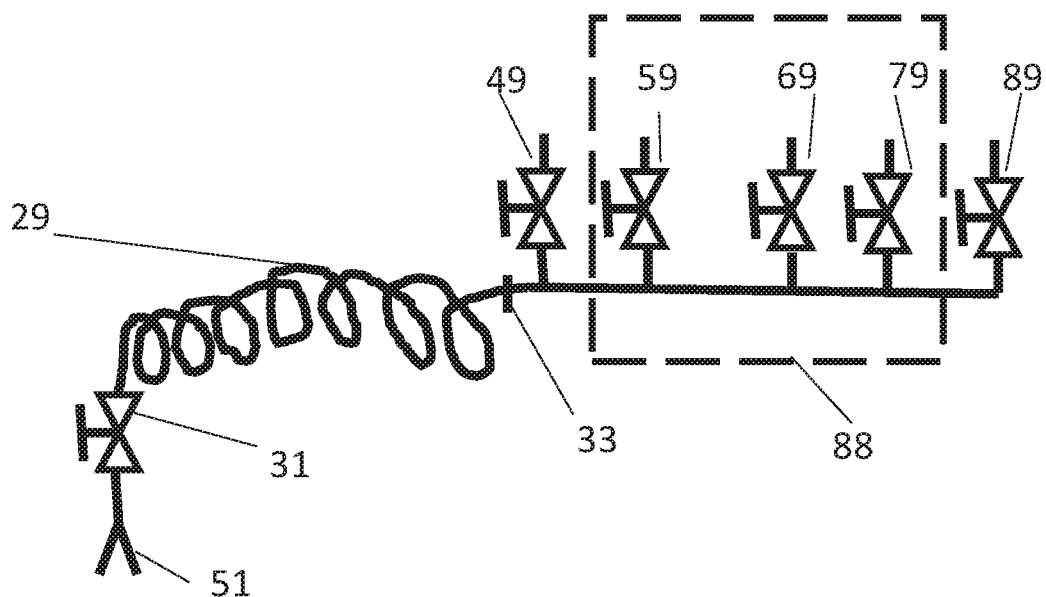
FIG. 8 shows a schematic of a fluid delivery valve connected to a storage cabinet and other connected valves.

Further even though only one fluid control valve 31 has been shown in this embodiment, just one fluid control valve is used to deliver multiple fluids including water, cooking oils, broths by using a valve bank as shown in FIG. 8 placed beyond the fixed clamp connection 33. In this embodiment, valve 49 is connected to a non-perishable ingredient source such as vegetable oil, valve 89 is connected to house water, valve 59, valve 69 and valve 79 are connected to ingredients storage containers in a refrigerated cabinet 88. House water is also used to flush the line after using other ingredients and releasing the rinse into the drain tray 12 though any one of the floor ingredient placeholder cutouts and exiting through a drain hole 42 as can be seen in FIG. 3.

As can be seen in FIG. 3-4 cooking pots in respective stations have lids 24, 25, 26 and 27 attached to stirrer arms 54, 55, 56 and 57 respectively. The stirrer arms are mounted to main frame 1 using respective hinge joints 34, 35, 66 and 37 such that the lids are able to be swiveled open or closed onto respective cooking pots as can be seen more clearly in FIG. 5. Furthermore each of the lids have stirring arrangements as can be seen in detailed views in FIG. 9 and FIG. 10 with stirring power delivered through stirrer power sockets 64, 65, 66 and 67 respectively. Also in FIG. 5 and FIG. 9 respective universal stove knob controls mechanisms 74, 75, 76 and 77 can be seen shown in further detail in FIG. 14. Again in FIG. 5 and FIG. 9 cooking pot temperature measurement thermocouple assemblies 44, 45, 46, 46*b*, 47 and 47*b* can be seem as well shown in further detail in FIG. 15.

Figure 9:
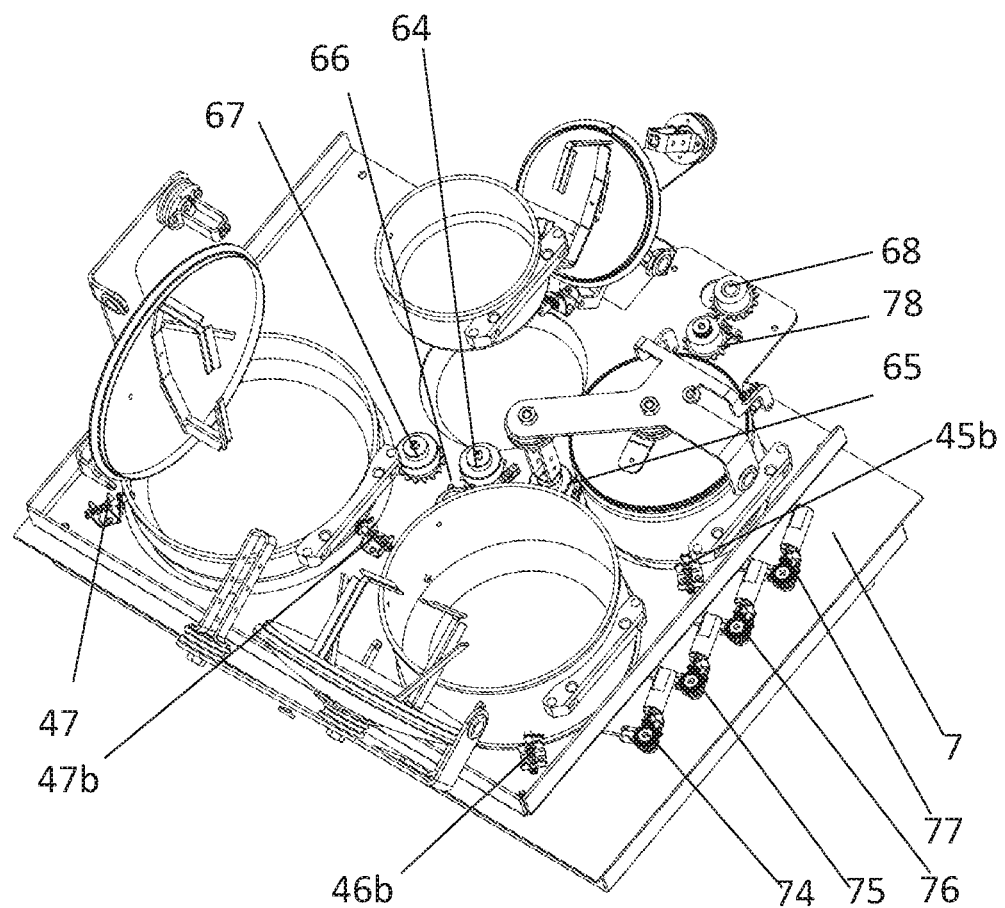
FIG. 9 shows a view of cooking stations area along with stove knob control mechanisms and stirring power sockets.
Figure 10:
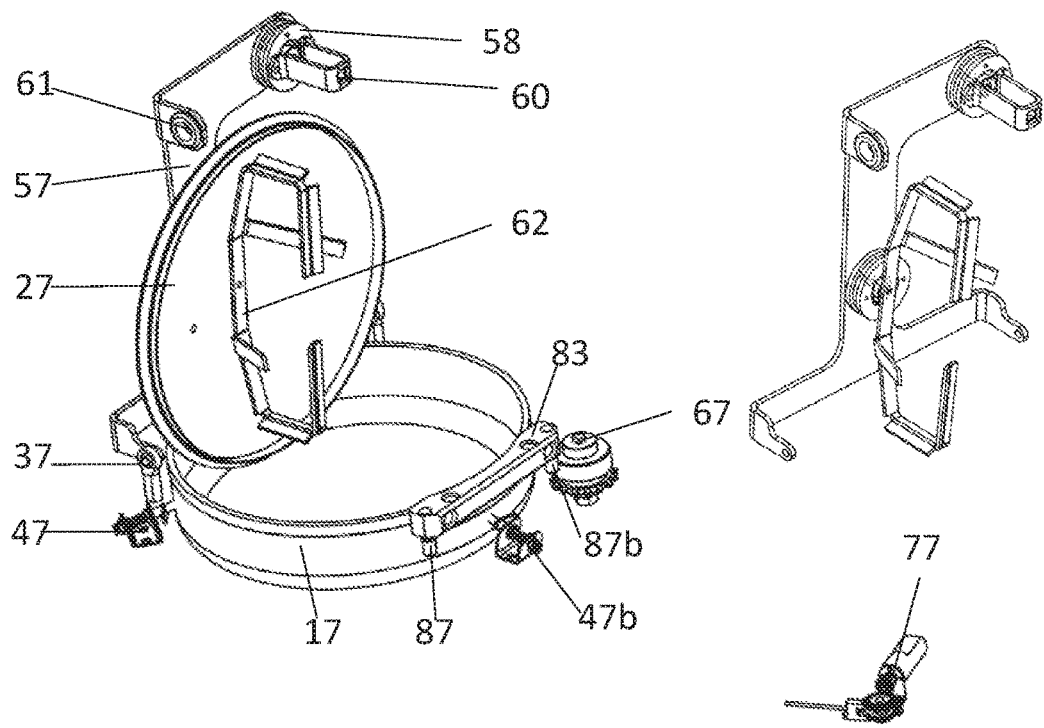
FIG. 10 shows a cooking station with a cooking pot, lid swiveled in an open position, stirring mechanism disengaged from stirrer power socket and respective heater power knob control mechanism.
Figure 12:
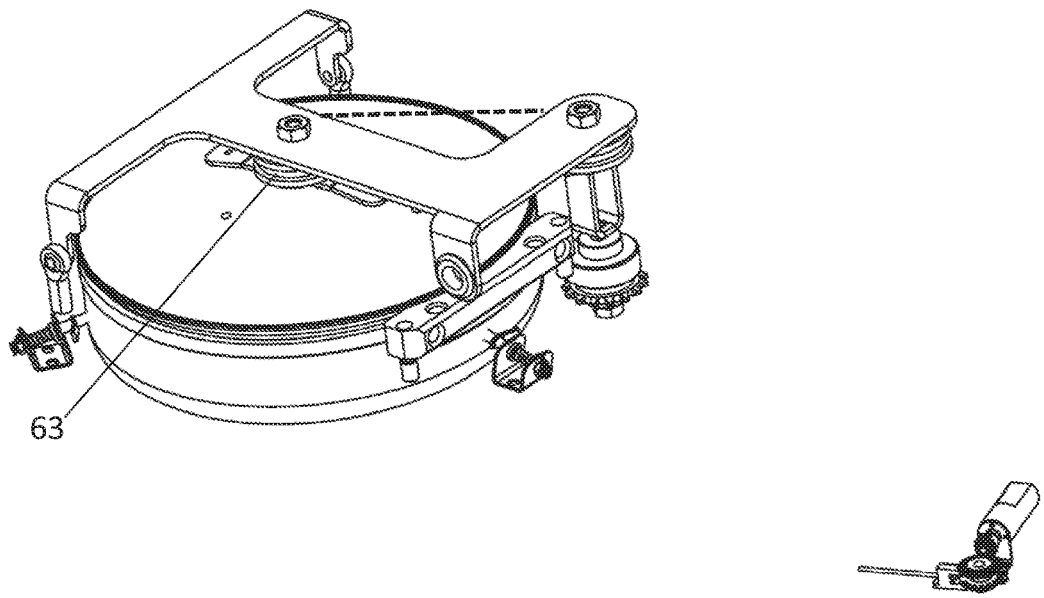
FIG. 12 shows a cooking station with cooking pot, lid in closed position, stirring mechanism engaged to stirrer power socket and respective heater power knob control mechanism.
Figure 13:
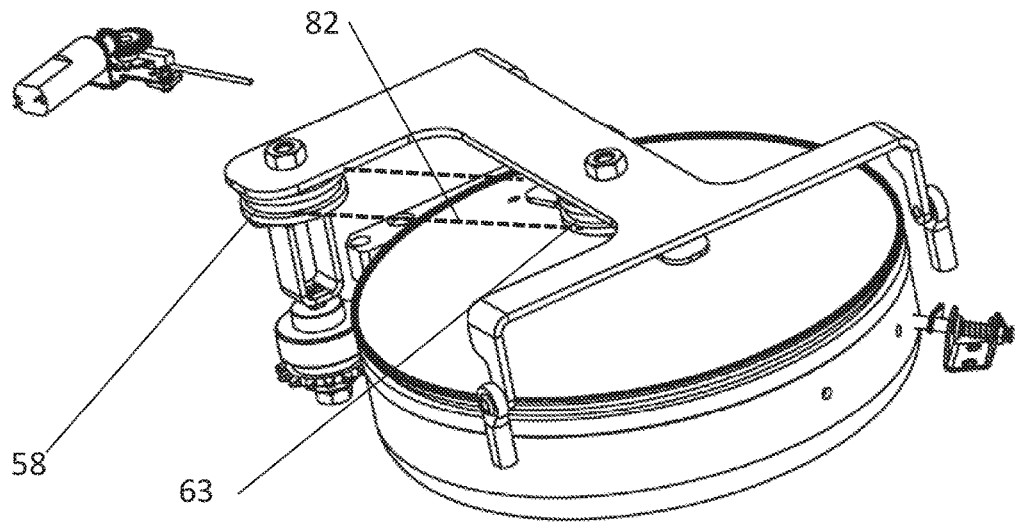
FIG. 13 shows an alternate view of a cooking station with cooking pot, lid in closed position, stirring mechanism engaged to stirrer power socket and respective heater power knob control mechanism.

Now referring to FIG. 9 and FIG. 10 where all of the components of the cooking station used for stirring and heating control are seen. FIGS. 10, 12 and 13 show in detail all the various components and how they work together to achieve automated cooking for each station. Cooking pot 17 receives heat from stove 7 which can be via radiation, induction, conduction or a gas burner. The stirrer arm 57 is connected by hinge 37 to the main frame floor 1 shown in FIG. 1-4. A stirrer clutch 60 is rotatable mounted to stirrer arm 57. A stirrer rotation transmission assembly comprising a driver pulley 58 and driven pulley 63 are rotatable mounted to stirrer arm 57. A stirrer clutch 60 is fixed to driver pulley 58 and stirrer 62 is fixed onto driven pulley 63. Lid 27 may be fixed to driven pulley 63 as well in which case it rotates with stirrer 62 and a gap is provided between lid 27 and cooking pot 17 in closed position to prevent their rubbing together. In another embodiment the lid 27 is rotatable mounted to stirrer arm 57 but free to rotate relatively and rests on cooking pot 27 in closed position.

With the lid 27 in the open position as in FIG. 10 cooking ingredients are transferred to cooking pot 17. In this embodiment the hinge axis falls inside the cooking pot and hence the edge of the lid 27 doesn't move beyond the edge of cooking pot 17 which present any splatter on main frame floor 1 and any condensate or other material collected on the lid 27 can flow back into cooking pot 17. A robot end effector hookup point 61 is used by a robot to close the lid 27 onto cooking pot 17 also engaging the stirrer clutch 60 onto respective stirrer power socket 67. A small gap is maintained between the lid 27 and cooking pot 17 so that the lid 27 can freely rotate without scraping the cooking pot 17 in this embodiment. When in this closed position as seen in views in FIG. 12 and FIG. 13 the rotation of a stirrer power socket 67 is transmitted to stirrer clutch 60 and driver pulley 58 which further makes the driven pulley 63 spin though a stirrer pulley belt 82. This causes both the lid 27 and stirrer 62 to start rotating. The cooking pot guide pin 87 attached to main frame floor 1 prevent the cooking pot 17 from rotating. Sprockets and chains are also used in another embodiment replacing the pulleys and belt. Any other power transmission means between two shafts including gears, generator-motor combinations can also be used for same.

Figure 14:
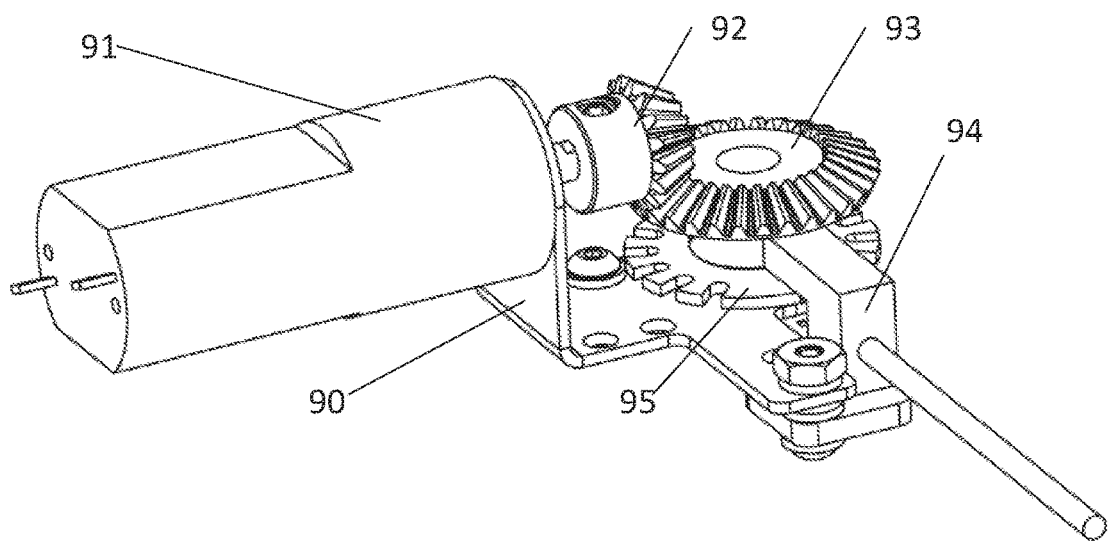
FIG. 14 shows a detailed view of a universal stove power knob control mechanism for cooking station power control by manipulating respective heater source control knobs.
Figure 15:
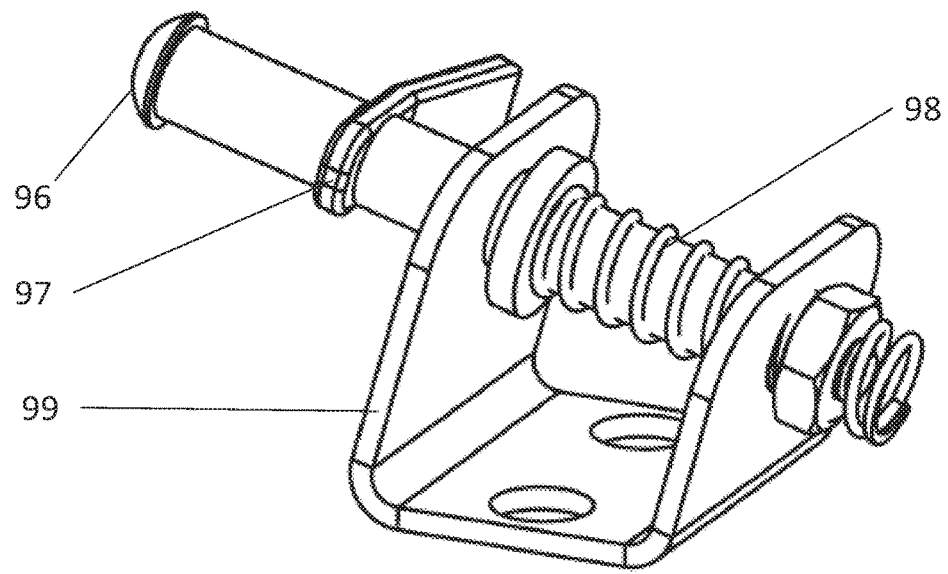
FIG. 15 shows a detailed view of a temperature sensors for measuring cooking pot temperature.

In FIG. 10, a primary temperature sensor 47 pushes against cooking pot 17 when it is placed in the cooking station as can be seen in more details in FIG. 15. A secondary thermocouple temperature sensor 47*b* is used and can help the controller in detecting azimuthal temperature non-uniformity. The non-uniformity of difference delta measured between the primary and secondary temperature measurements is also used to trigger stirring in an embodiment. The primary temperature sensor measurement is also used to estimate the heater power setting level and triggers adjustments made by the corresponding knob actuator controller assembly 77 for cooking pot 17 and shown in detail in FIG. 14.

Figure 11:
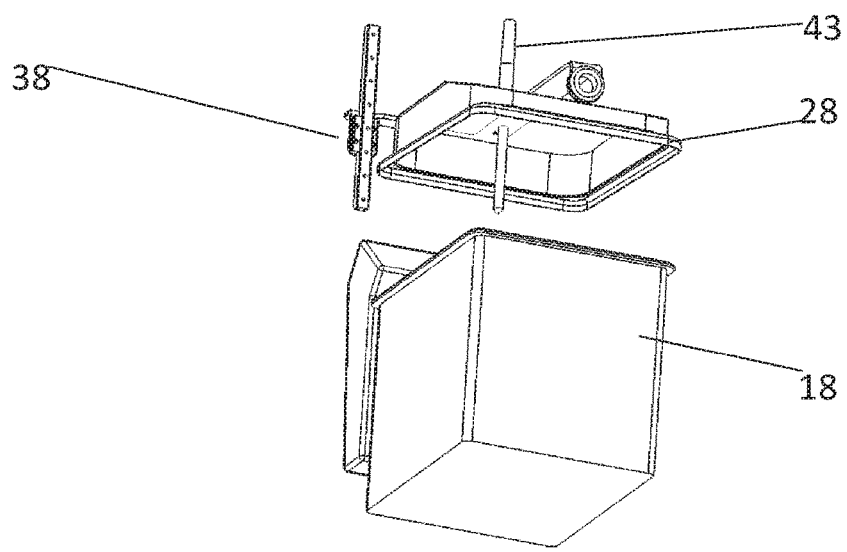
FIG. 11 shows a deep fryer station with fryer lid on a vertical lifting slider in open position.

Quick disconnect hinge joints 34, 35, 36 and 37 as can be seen in FIG. 5 have been used for easy removal and attaching cooking pot stirrer arms 54, 55, 56, 57 and a sliding joint has been used for the deep fryer as can be seen in FIG. 11. The cooking pots can also use sliding joint for separating the lid from the cooking pot similar to deep fryer 18 where the deep fryer lid 28 is attached to a linear guide slider joint 38. A temperature sensing thermocouple 43 is fixed to deep fryer lid 28 and comes in contact with the frying medium when deep fryer lid is placed on to the deep fryer 18.

Figure 16:
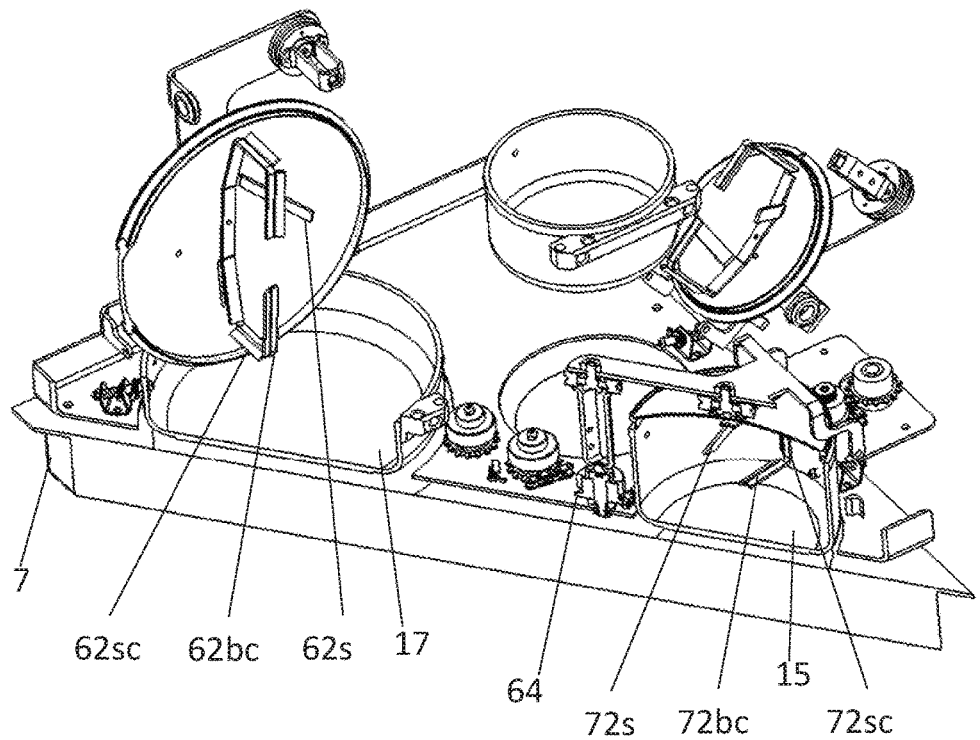
FIG. 16 shows a cross section of two cooking stations detailing the stirrer side and bottom scraping parts.

FIG. 16 further shows a cross section view across cooking stove 7, cooking pot 15 and cooking pot 17. The stirrer for cooking pot 17 has three parts side scraper 62*sc*, bottom scrapper 62*bc* and stirrer mixer 62*s*. The three corresponding stirrer parts for cooking pot 15 can be seen in action with bottom scraper 72*bc* scraping the bottom of cooking pot 15, side scraper 72*sc* in contact sidewall of cooking pot 15 and stirrer mixer 72*s* moving the middle of the cooking pot 15 contents.

FIG. 14 shows a detailed view of knob controller actuator assembly that can be installed onto cook stove 11 manual control shafts that conventional stoves are sold with. A manual knob is pulled out of the stove and the knob controller actuator assembly is installed with the bevel gear 93 on the manual control shaft. A knob controller bracket 90 is attached to mezzanine 7 as can be seen in FIG. 4. Referring back to FIG. 14A motor 91 mounted on knob controller bracket 90 drives a bevel pinion 92. A position sensing optical disk in combination with laser sensor 94 detects any rotation of the bevel gear. Motor 91 and laser sensor 94 are interfaced to the controller and together can move the knob to set a desired heating power for a cooking station.

Figure 17:
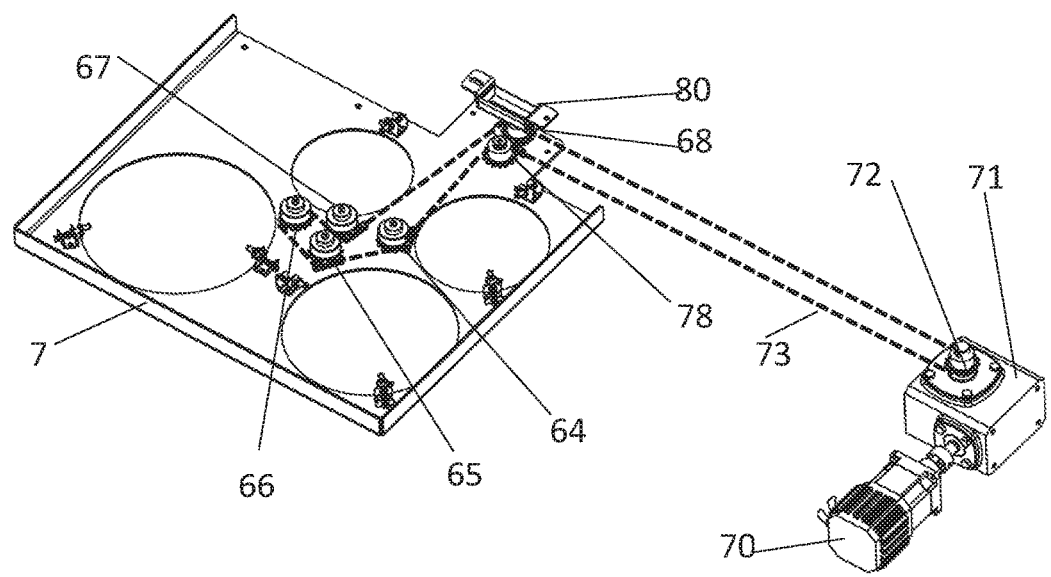
FIG. 17 shows a view of the cooking appliance mezzanine showing the stirrer power transmission mechanism details.

FIG. 17 shows the stirrer power delivery mechanism with stirrer power sockets 64, 65, 66 and 67 utilizing sprockets rotatable mounted to mezzanine 7. Additional first idler sprocket 78 is rotatable mounted to mezzanine 7 and a second idler sprocket 68 is mounted via a chain tensioner 80 to mezzanine 7. The positions of stirrer power sockets 65-67 and idler sprockets 68 and 78 are strategically arranged such that a chain 73 can drive all sprockets while negotiating the narrow space between cooking pots 14-17 and further they allow the driving sprocket 72 for chain 73 to be located remotely and in an embodiment inside the controller 8. The driving sprocket 72 is mounted in an embodiment on a gearbox 71 to enhance torque provided by stirrer motor 70. In an embodiment both the stirrer motor 70 and gearbox 71 are located inside controller 8. Sharing a single stirrer among all cooking stations along with selective engagement by closing lids is very advantageous in reducing overall cost of the automatic cooking appliance however in another embodiment individual motors are also provided. The chain 73 can be replaced with a belt when pulleys are used instead of sprockets.

Figure 18:
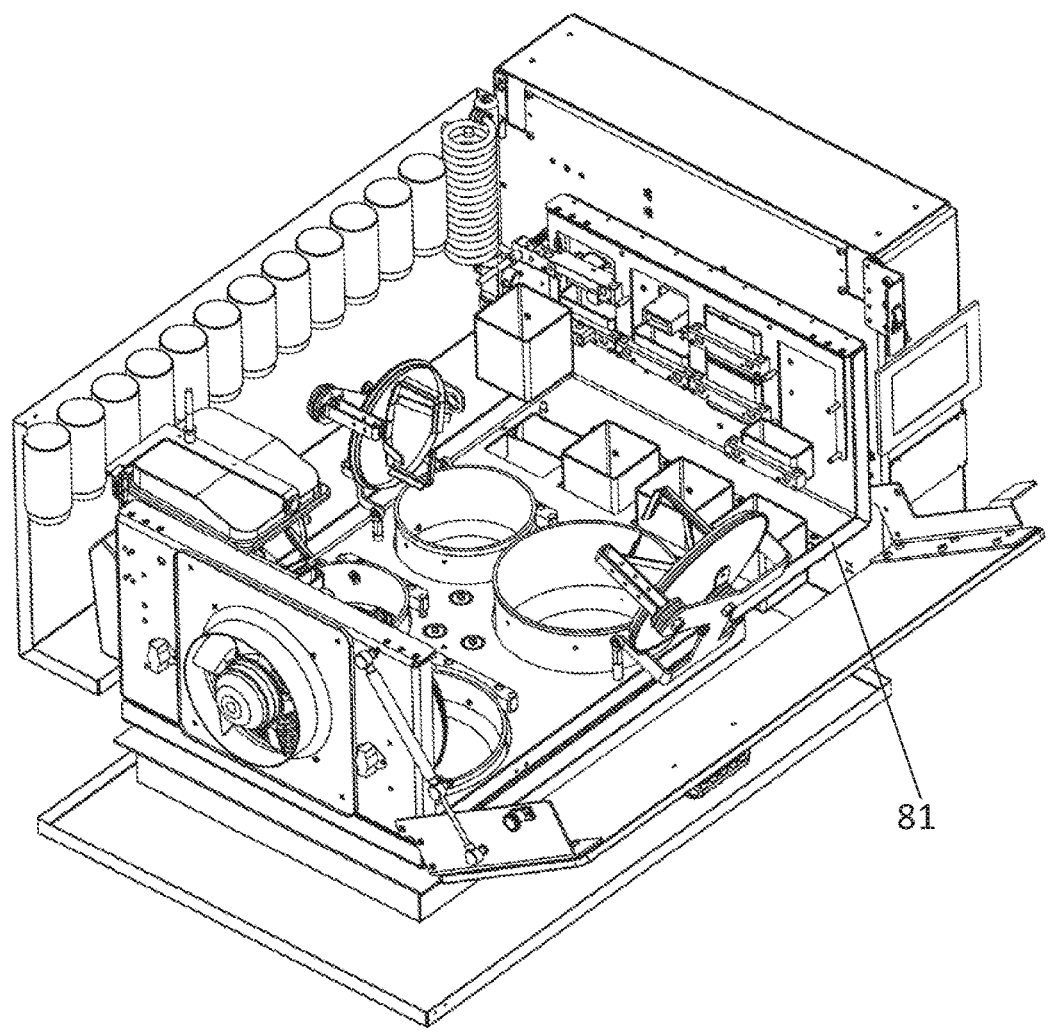
FIG. 18 shows another embodiment of an automatic cooking appliance with a shorter main frame to fit within the footprint of a 36" wide household cooking range oven.
Figure 19:
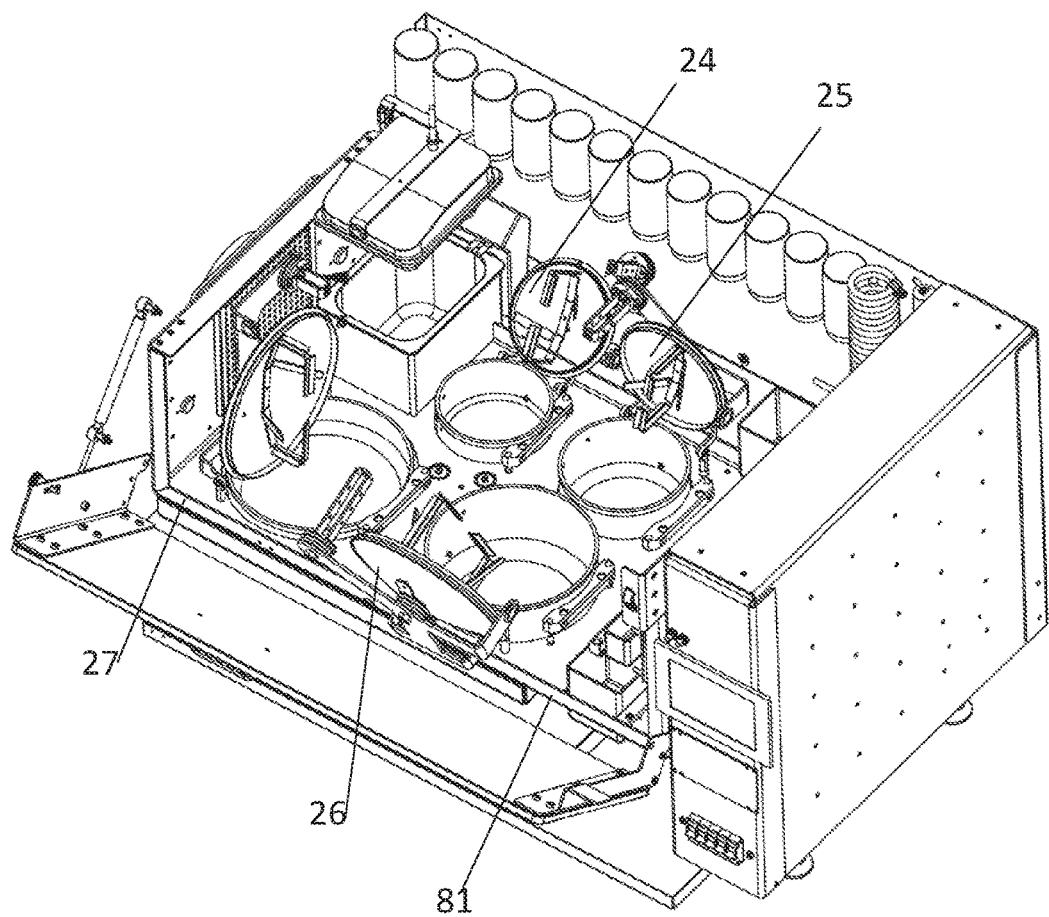
FIG. 19 shows and alternate view of another embodiment of an automatic cooking appliance with a shorter main frame to fit within the footprint of a 36" wide household cooking range oven.

FIGS. 18 and 19 show another embodiment of an automatic cooking appliance using a shorter length main frame 81 where space may be further constrained but some tradeoff is acceptable with reduced number of floor ingredient bins. In an embodiment the automatic cooking appliance as shown in FIG. 18 has only four floor ingredient bins and is approximately same size as a standard cooking range 36" wide, 30" deep and 36" tall.

All though the invention has been described herein in connection with various preferred embodiments, there is no intention to limit the invention to those embodiments. It should be understood that various changes and modifications to the preferred embodiments will be apparent to those skilled in the art. Such changes and modifications may be made without departing from the spirit and scope of the present invention and without diminishing its attendant advantages. Therefore, the appended claims are intended to cover such changes and modifications.

What is claimed is:

1. A cooking appliance comprising:
    a plurality of cooking stations;
    at least one of said plurality of cooking stations comprises of a heating source, a cooking pot, a lid, a stirrer, said lid and said stirrer rotatably mounted to a stirrer arm, said stirrer arm rotatably attached to a frame to allow open and close positions for said lid for transfer of cooking ingredients in said cooking pot, a stirrer clutch and a stirrer rotation transmission assembly to transmit rotation of said stirrer clutch to said stirrer;
    a plurality of stirrer power sockets located on said frame;
    wherein, said stirrer clutch is able to plug into a respective said stirrer power socket to enable stirrer rotation in said cooking pot.

2. A cooking appliance as in claim 1, further comprising a remote stirring motor providing rotation power to said stirrer power sockets via sprocket chain or belt pulley drive arrangements.

3. A cooking appliance as in claim 1, further comprising:
    a plurality of floor ingredient bins placed on said frame;

a plurality of wall ingredient bins placed on at least one side wall.

4. A cooking appliance as in claim 1, further comprising:
a plurality of floor ingredient bins placed on said frame;
a plurality of ingredient containers placed on a back wall.

5. A cooking appliance as in claim 1, further comprising;
an exhaust fan and filter to remove cooking fumes from said cooking appliance;
a drain tray to catch and drain away all fluids and particulates droppings from all parts of said cooking appliance.

6. A cooking appliance as in claim 1, further comprising:
A hinge assembly movably connecting said stirrer arm to said frame where said hinge axis lies inside said cooking pot allowing any condensate on said lid to flow back into said cooking pot when said lid is opened.

7. A cooking appliance as in claim 1, further comprising:
A primary temperature sensor coming in contact with said cooking pot when placed in said cooking station and used to monitor said cooking pot temperature.

8. A cooking appliance as in claim 7, further comprising:
a secondary temperature sensor coming in contact with said cooking pot at a different location than said primary temperature sensor allowing to measure temperature non-uniformity across said cooking pot.

9. A cooking appliance as in claim 1, further comprising:
a deep fryer;
a fryer lid to cover said deep fryer attached to said frame using a linear slide;
a temperature sensor fixed on said flyer lid for measuring frying medium temperature when said flyer lid is closed.

10. A cooking appliance as in claim 1, further comprising:
an electrically controlled actuator driven knob position controls for adjusting power of said heating source for each of said plurality of cooking stations.

11. A cooking appliance as in claim 1, further comprising:
quick disconnect hinge joints for easy removal of said stirrer arm allowing easy cleaning of said cooking appliance;
said stirrer arm, said lid, said stirrer, said stirrer clutch, said stirrer rotation transmission assembly able to be cleaned outside manually or putting inside a household dishwasher.

12. A cooking appliance as in claim 1, further comprising:
a side scraper part on said stirrer coming in contact with a side wall of said cooking pot;
a bottom scraper part on said stirrer coming in contact with a bottom of said cooking pot;
a stirrer mixer part on said stirrer coming in contact with said bottom of said cooking pot.

13. A cooking appliance as in claim 1, further comprising:
a universal tool carrier with an extendable hose cable assembly connecting said universal tool carrier to a fixed connection clamp.

14. A cooking appliance as in claim 13, further comprising: a electrically controlled fluid delivery valve attached to said universal tool carrier.

15. A cooking appliance as in claim 14, further comprising:
a spring mounted temperature measurement probe attached to said universal tool carrier.

16. A cooking appliance as in claim 15, further comprising:
an environmentally controlled cabinet storing a plurality of fluidic cooking ingredients with respective delivery valves connected to said extendable hose cable assembly at said fixed connection clamp.

17. A cooking appliance as in claim 1, further comprising:
a fixed camera on a side wall for machine vision and scanning;
a thermal safety switch interlock.

18. A cooking appliance as in claim 1, further comprising:
a deep flyer, a small sauce pan cooking pot, a large sauce pan cooking pot, a casserole cooking pot and a skillet cooking pot;
an induction stove heating source;
twelve floor ingredient bin placeholders and eight wall ingredient bin placeholders on a side wall.

19. A cooking appliance as in claim 1, further comprising:
a deep flyer, a small sauce pan cooking pot, a large sauce pan cooking pot, a casserole cooking pot and a skillet cooking pot;
an induction stove heating source;
four floor ingredient bin placeholders and eight wall ingredient bin placeholders on a side wall, wherein said cooking appliance measures no wider than thirty six inches and no deeper than thirty inches.

\* \* \* \* \*